No. 869,135. PATENTED OCT. 22, 1907.
G. A. BURBANK & C. B. CARR.
METHOD OF MAKING SCALE LOOPS.
APPLICATION FILED MAY 4, 1906.

George A. Burbank
Charles B. Carr
Inventors

Witness
George C. Fryer
Marshall Montgomery

Sturtevant and Greeley
Attorneys

UNITED STATES PATENT OFFICE.

GEORGE A. BURBANK AND CHARLES B. CARR, OF ST. JOHNSBURY, VERMONT.

METHOD OF MAKING SCALE-LOOPS.

No. 869,135.            Specification of Letters Patent.            Patented Oct. 22, 1907.

Application filed May 4, 1906. Serial No. 315,186.

*To all whom it may concern:*

Be it known that we, GEORGE A. BURBANK and CHARLES B. CARR, citizens of the United States, residing at St. Johnsbury, in the county of Caledonia, State of Vermont, have invented certain new and useful Improvements in Methods of Making Scale-Loops, of which the following is a description, reference being had to the accompanying drawing and to the letters and figures of reference marked thereon.

This invention relates to an improved method of manufacturing scale loops. The process of manufacturing these articles as universally practiced in scale factories is one that requires highly skilled labor, and is expensive, many of the articles, when nearly completed, being split or otherwise damaged and rendered unfit for use.

In order to arrive at a clearer understanding of the advantages of the present method, the manufacture of loops as now practiced, will be briefly described.

The stock is taken from a bar of suitable size and length, after which the ends are heated and hammered down flat. The flattened portion is then split at the point which afterwards forms the center of the loop end and in the opening thus formed, is placed a hardened steel block to subsequently form a knife edge bearing; the whole is then forged to weld the block securely in place. The flattened end, with the bearing block in place is then bent to form an eye and the end of the bar is swaged to the main body of the bar. It is obvious that great skill and care is necessary in placing the block in place in the first instance so that it may be exactly central in the finished eye or loop, and, owing to the difference in quality of the metals the bars will frequently split and leave the block free during the eye forming operation. The frequent hammering toughens or hardens the metal so that the whole must be annealed before machining and in the annealing operation the blocks are sometimes loosened. In carrying out the present invention, all of these disadvantages are overcome and the loops may be more accurately and quickly made; produced at far less expense, and the annealing operation is dispensed with.

Figure 3:
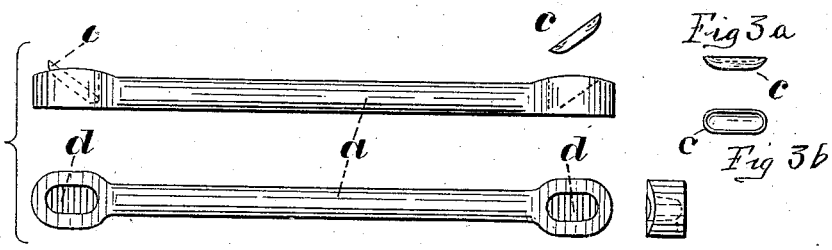
Figure 4:
Figures 5, 6:
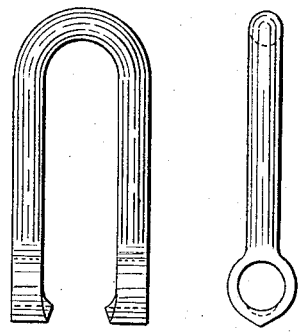

The group of figures (1) represents an edge, top, and end view of the blank from which the loop is made; the group of figures (2) represents similar views of the blank after it has been drop forged or pressed; the group of figures (3) is a similar view, showing the manner of introducing the steel bit into the enlarged ends of the bar; Figs. 3$^a$ and 3$^b$ are edge and front views of the bit; the group of figures 4 represents side and plan views of the blank after all the operations are completed, except bending to loop shape; and Fig. 5 is a front view, and Fig. 6 an edge view of the completed loop.

Figure 1:
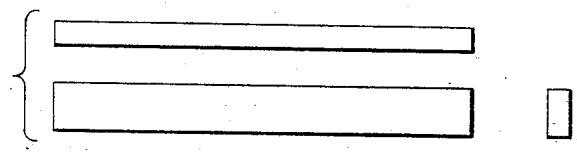
Figure 2:
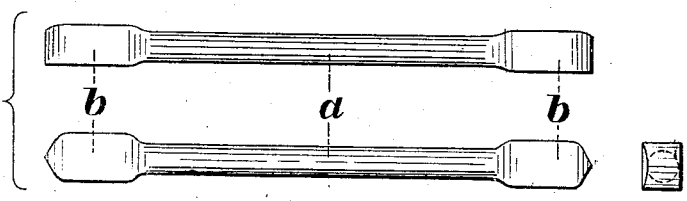

In carrying out our invention, we take a piece of stock, as shown at $a$ in Fig. 1, and forge it in a press or drop it with dies to leave the metal in the shape shown in Fig. 2, in which $a$ represents the rounded shank and $b$ the ends of the same, the shank having been drawn. When the bar has been shaped as shown in Fig. 3, steel bits $c$ are introduced into the enlarged ends of the bar. The ends of the bar are first provided with angular recesses $d$ as shown in full lines on the plan view Fig. 3 and in dotted lines on the elevation, these depressions or recesses being formed by the introduction of any desired form of tool. The bits $c$ are then placed in these recesses as shown in Fig. 3 and are then forced down flat, or so that their lengths shall be transverse to the bar as shown in Fig. 4 and in accomplishing this operation the recess or depression is continued through the bar to form an opening therein, while the back of the bit becomes welded to the wall of said opening. During this welding process the opening is preferably made to assume a circular shape although it may remain oblong if desired. The advantage of this arrangement is, that there is no free shank portion, which has to be hammered down and welded to the other portion as heretofore constructed, and thus as there is no necessity of hammering on the shank the loop does not have to go through the process of annealing, which is usually the case. Aside from this, the hardened bits or blocks may be more accurately centered in a finished eye than in a bar which is subsequently bent to form an eye, and the strain of bending, which frequently displaces the block in the older method is dispensed with.

What we claim as our invention, is:—

1. In the manufacture of scale loops, the herein described method of forming an eye and introducing a bit thereinto, said method consisting in forming a recess with an oblique bottom in a metal bar, placing a bit in such recess, and forcing the bit through the bar to enlarge the recess into an eye and simultaneously welding the bit to the inner wall of such eye.

2. That method of forming a reinforced eye in a metal bar which consists in forcing a hardened bit through the bar to form an eye therein and gradually turning the bit during such operation until it assumes a position with its length transverse to the bar, the bit being welded in the inner wall of the eye during the operation.

In testimony whereof we affix our signatures, in presence of two witnesses.

GEORGE A. BURBANK.
                           CHARLES B. CARR.

Witnesses:
    HERBERT W. HOVEY,
    GEORGE C. FRYE.